Figure 1:
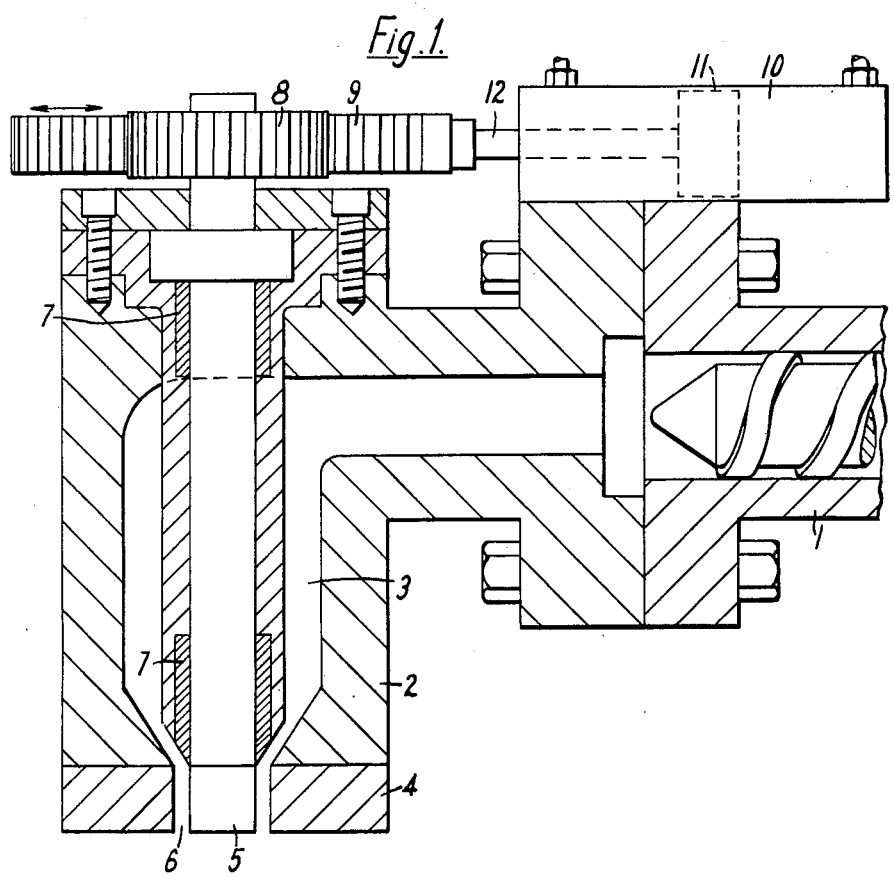

June 14, 1966   J. F. E. ADAMS   3,256,377
EXTRUSION OF THERMOPLASTIC TUBES
Original Filed April 10, 1962   2 Sheets-Sheet 2
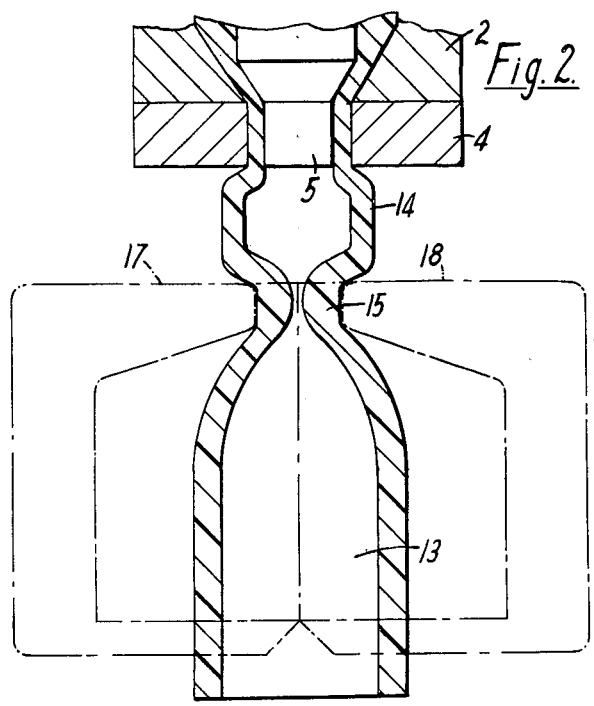
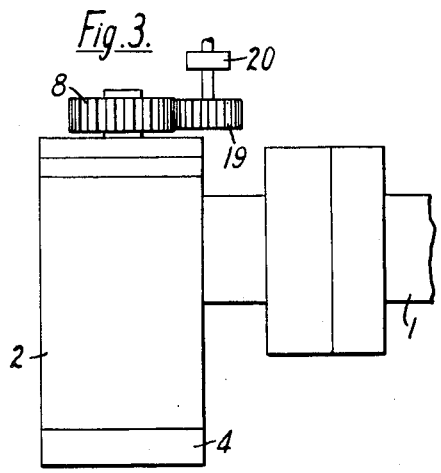
Inventor
JOHN F. E. ADAMS
By Munrie and Hurley
Attorneys

United States Patent Office 3,256,377
Patented June 14, 1966

3,256,377
EXTRUSION OF THERMOPLASTIC TUBES
John Francis Edward Adams, Tewin, Welwyn, England, assignor to The Metal Box Company Limited, London, England, a British company
Original application Apr. 10, 1962, Ser. No. 186,399. Divided and this application Sept. 2, 1964, Ser. No. 400,295
Claims priority, application Great Britain, Apr. 27, 1961, 15,312/61
3 Claims. (Cl. 264—209)

This application is a division of application Serial No. 186,399, filed April 10, 1962, now abandoned.

This invention relates to the extrusion of synthetic thermoplastic tube particularly in the production of thermoplastic bottles formed by the expansion of a softened length of extruded tube which is enclosed in a mould and expanded to the internal configuration of the mould by the introduction of fluid pressure into the enclosed tube length.

It is an object of the present invention so to effect the extrusion of a softened length of tube for enclosure in a mould and expansion therein as to control the weight per unit length of the material forming the tube, and it is a further object so to form the tube for a bottle that the tube portion which is to form the neck of the bottle has a diameter such that it will be housed in the neck-forming portion of the mould without being pinched by the mould, as has hitherto been necessary, while the main body of the bottle can be formed from a tube portion which is of relatively large diameter.

According to the invention there is provided the method of producing from synthetic thermoplastic material a parison for inflation in a mould, said parison consisting of a tube the weight per unit length of which varies at predetermined positions lengthwise of the tube, by extruding the material through an extrusion orifice at a constant rate and periodically reducing the weight per unit length of the tube by decreasing longitudinal contraction of the material in the direction of extrusion by subjecting the material to a circumferential shearing action in one direction to create residual hoop stresses in the material about to issue through the orifice.

In order that the invention may be clearly understood one embodiment thereof will now be described, by way of example, with reference to the accompanying diagrammatic drawings, in which:

FIG. 1 is a diagrammatic sectional elevation of apparatus according to the invention, FIG. 2 illustrates the formation of a length of tube extruded by the apparatus for enclosure in a mould, and FIG. 3 diagrammatically illustrates an alternative form of the apparatus.

Referring to the drawings, an extrusion machine 1 of any suitable known kind for extruding molten synthetic thermoplastic material, such as polyethylene, has fitted thereto a die which includes a housing 2 having a passage 3 through which molten synthetic thermoplastic material is fed to the die. An annular cover 4 is secured to the outlet end of the housing 2 and together with a core 5 which is co-axial therewith forms an annular extrusion orifice 6 through which the molten material is extruded as a tube.

The core 5 is mounted for rotation about the axis thereof in bearings 7 carried by the die housing 2 and to the end of the core remote from the end thereof which co-operates with the cover 4 to form the annular extrusion orifice 6 there is secured a pinion 8. The pinion 8 meshes with a toothed rack or segment 9 which is connected with operating means whereby rotation of the core 5 can be selectively effected for predetermined intervals. With this form of apparatus the core 5 can be rotated in one direction during the creation of a shearing action in one portion of molten material passing through the die, and in the reverse direction while another portion of the material is passing through the die. In one embodiment of the invention the operating means comprises a pneumatic device formed by an air cylinder 10 housing a piston 11 the connecting rod 12 for which is connected to the rack or segment 9 to effect operation thereof.

In operation, the die functions in the customary known manner during the extrusion of that portion 13, FIG. 2, of a tube length which is to form the main body of a bottle or other article which is formed by expansion of the tube length while it is enclosed in a mould, and the tube tends to swell as it leaves the extrusion orifice as indicated at 14, FIG. 2. During the extrusion of that part 15 of the tube length which is to form the neck of a bottle the core is rotated relative to the cover and by so doing induces in one direction a shearing action around the circumference of the material passing through the extrusion orifice 6. The shearing action forms in the material a residual hoop stress which as the material leaves the die causes contraction of the tube towards the axis thereof thereby forming a tube portion 15 which is of lesser external diameter than that of the normally extruded portion 13 of the tube length and which has a greater wall thickness than that of the normally extruded portion of the tube length. The timing of the rotation of the core 5 is such that it occurs when and while the molten material passing through the die is that portion of the material which is to form the neck of the bottle, and the contraction effected as the material leaves the die, and due to said residual hoop stress, is such that the neck-forming portion 15 of the tube can be housed in the neck-forming portion 16 of the mould without being pinched thereby. In one embodiment of the invention in which the core is rotated during the extrusion of material which is to form the neck of a bottle, the core is rotated for approximately one quarter of a turn at a rate of about 20 r.p.m.

The mould is a sectional mould comprising sections 17, 18 supported in known manner, not shown, for movement towards and away from each other, and, if desired for movement towards and away from the die along the axis of extrusion. Means, also not shown, known per se are provided to effect expansion of a tube length to conform it to the shape of the interior of the closed mould. Cutting means, not shown, of known kind are arranged to sever the tube length enclosed in the mould from the parent tube being extruded through the orifice 6.

It will be understood that, if desired, the relative rotational movement between the core 5 and cover 4 can be effected by rotation of the cover instead of the core as described above, or alternatively both the core and the cover may be rotated in the same direction in which instance the core will be rotated at a different angular velocity from that at which the cover is rotated in order to induce the said circumferential shearing action in one direction in the material passing between the core and cover.

Further, if desired, the diameter of the extruded tube may be controlled by rotating the core continuously in one direction by a driving gear 19, FIG. 3, the reduction in diameter of the tube and the thickness of the tube wall being proportional to the rate of rotation of the core, and rotation of the core can be controlled, for example, by a variable speed driving mechanism 20, to obtain cyclic variations of the rate of rotation and periods of rest.

Distribution of the material along the length of a tube in this manner is possible because of the interaction of the circumferential shearing action on the longitudinal stress pattern in the direction of the extrusion the weight per inch of the tube is reduced whilst the circumferential shearing action is taking place, due to the fact that less longitudinal contraction of the polymer takes place whilst the circumferential shearing action is applied.

The continuous or intermittent rotation of the core can be used to distribute the material more evenly in an article moulded from the extruded tube since where a reduction in thickness is required the core may be rotated at a greater speed thereby causing a reduction in the weight per unit length of the tube.

I claim:

1. A method of extruding a parison, whose weight per unit length, diameter and wall thicknes vary in the extrusion direction, for subsequent inflation in a mould, comprising the steps of continuously extruding thermoplastic material through an annular die orifice having a core at a constant rate to form a tube, and applying to the wall of said tube a series of brief tangential shearing forces insufficient to sever the wall by periodically rotating said core and die orifice relative to each other, each of said shearing forces being applied for less than one turn.

2. The method as claimed in claim 1 wherein each shearing force of said series is aplied by rotating said core about one quarter turn at a rate of approximately 20 r.p.m.

3. The method as claimed in claim 1 wherein each shearing force of said series comprises opposed circumferential frictional forces applied to the inner and outer wall of said tube as it leaves the extrusion orifice, the successive shearing forces of said series being resultants in the same direction of the said opposed forces.

References Cited by the Examiner

UNITED STATES PATENTS

| | | | |
|---|---|---|---|
| 2,632,202 | 3/1953 | Haines | 18—5 |
| 2,801,441 | 8/1957 | Wadsworth | 18—149 |
| 3,008,187 | 11/1961 | Slade | 264—119 |
| 3,020,588 | 2/1962 | Ferguson et al. | 18—149 |
| 3,029,468 | 4/1962 | Valyi | 18—5 |
| 3,059,277 | 10/1962 | Pierce et al. | 18—149 |

ROBERT F. WHITE, *Primary Examiner.*

ALEXANDER H. BRODMERKEL, *Examiner.*

M. H. ROSEN, L. S. SQUIRES, *Assistant Examiners.*